US012675747B2

(12) United States Patent
Sangode et al.

(10) Patent No.: US 12,675,747 B2
(45) Date of Patent: Jul. 7, 2026

(54) SYSTEM AND METHOD FOR MATCHING ENTITIES USING MACHINE LEARNING

(71) Applicant: Morgan Stanley Services Group Inc., New York, NY (US)

(72) Inventors: Asit Chandrashekhar Sangode, Jersey City, NJ (US); Sreekar Bhaviripudi, Jersey City, NJ (US); Tejaswi Sutrala, Jersey City, NJ (US); Matthew McAndrew, Purchase, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/958,226

(22) Filed: Nov. 25, 2024

(65) Prior Publication Data

US 2026/0148146 A1 May 28, 2026

(51) Int. Cl.
    *G06N 20/20* (2019.01)
    *G06Q 10/1053* (2023.01)
    *G06Q 10/40* (2026.01)

(52) U.S. Cl.
    CPC ......... *G06N 20/20* (2019.01); *G06Q 10/1053* (2013.01); *G06Q 10/40* (2026.01)

(58) Field of Classification Search
    CPC ..... G06Q 10/1053; G06Q 50/01; G06N 20/20
    See application file for complete search history.

(56) References Cited

U.S. PATENT DOCUMENTS

| | | | |
|---|---|---|---|
| 8,818,910 B1* | 8/2014 | Liu | G06Q 10/1053 |
| | | | 705/321 |
| 11,682,029 B2* | 6/2023 | Sharma | G06Q 30/0203 |
| | | | 705/7.29 |
| 11,809,976 B1* | 11/2023 | Li | G06N 20/20 |
| 11,977,965 B1* | 5/2024 | Shen | G06N 3/045 |
| 2015/0161567 A1* | 6/2015 | Mondal | G06Q 10/1053 |
| | | | 705/321 |
| 2019/0026489 A1* | 1/2019 | Nerurkar | G16H 10/60 |
| 2019/0279097 A1* | 9/2019 | Baines | G06F 16/9027 |
| 2020/0402013 A1* | 12/2020 | Yeung | G06Q 10/1053 |

OTHER PUBLICATIONS

Beamery ("The Secrets To Better Succession Planning".Aug. 30, 2024, Retrieved at https://beamery.com/resources/blogs/the-secrets• (Year: 2024).*

(Continued)

*Primary Examiner* — Beth V Boswell
(74) *Attorney, Agent, or Firm* — PEARL COHEN ZEDEK LATZER BARATZ LLP

(57) ABSTRACT

A system and method may identify the best matching entities using artificial intelligence, by for example determining, from a set of features describing a number of entities, a subset of features which when input to a machine learning module allow the machine learning module to match a pair of entities based on the ability of the second entity in the pair to successfully take over responsibilities handled by the first entity in the pair; training a machine learning module using the determined features; and for a first entity described by the determined set of features, using the machine learning module to determine a list of entities matching the first entity, each entity in the list of entities associated with a matching score.

9 Claims, 4 Drawing Sheets

(56) References Cited

OTHER PUBLICATIONS

Cerrato, Jason. ("Real-time succession planning is made easier with AI". Oct. 31, 2023. Retrieved at https://eightfold.ai/blog/real-time-succession-planning-made-easier-with-ai/) (Year: 2023).*

Vorecol. ("The Role of AI in Modern Succession Planning Software". Sep. 3, 2024. Retrieved at https://vorecol.com/blogs/blog-the-role-of-ai-in-modern-succession-planning-software-178159) (Year: 2024).*

* cited by examiner

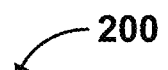
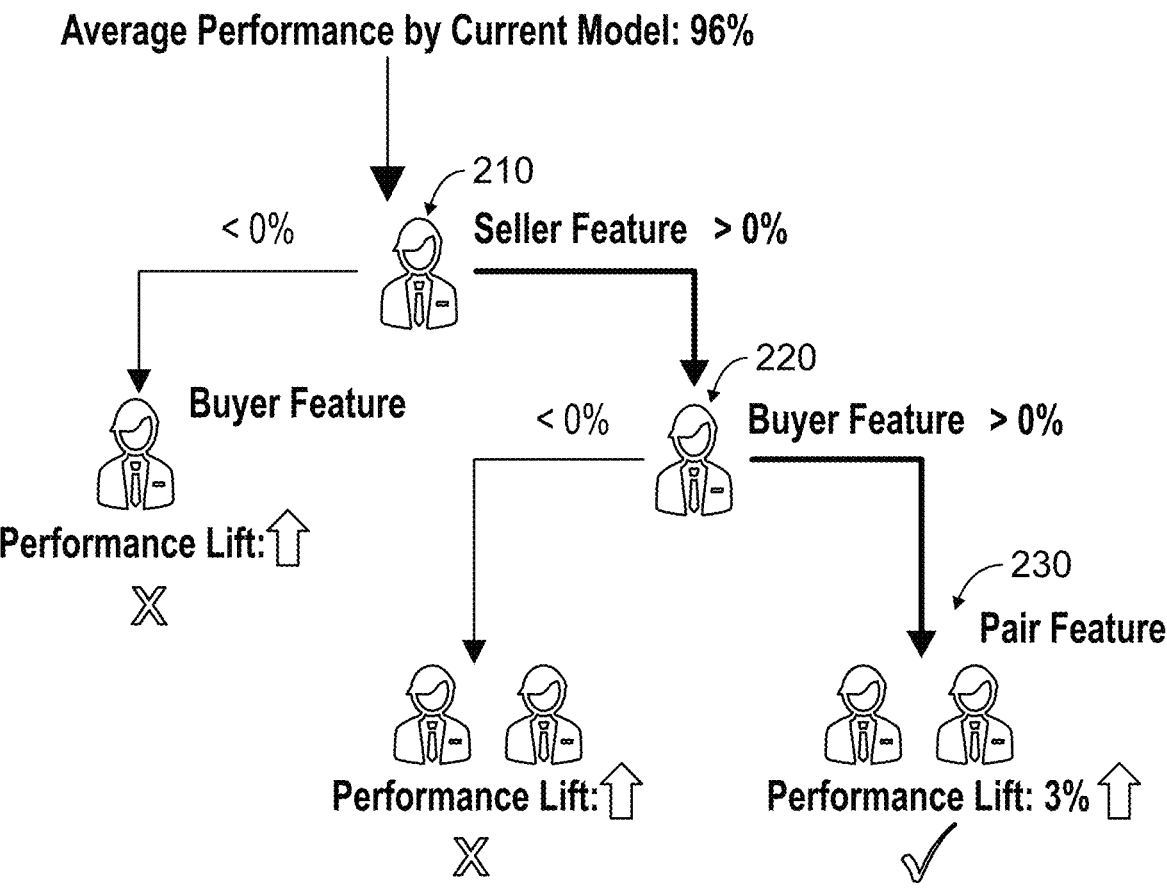
FIG. 2

Examples of Viable Pair Feature Conditions with Positive Lift

| Pair Features | Seller Conditions | Buyer Conditions | Lift% | Volume% | |
|---|---|---|---|---|---|
| # ALGs w/ Cash Equivalent Share | >0% | > 0% | 6% | 6% | Positive lift cases from Client Account Mix |
| # Households w/ 5-10 Money Markets Share | >5% | >10% | 5% | 5% | |
| # ALGs w/ 1-5 Money Markets Share | >28% | >30% | 1% | 7% | |
| # Households w/ Alternate Investments Share | >6% | >9% | 6% | 5% | Positive lift cases from Advisor Product Mix |
| Private Banking Cash Products SR | >1% | >1% | 3% | 3% | |
| Investment Strategy Soln. Alternate Manages Futures SR | >11% | >5% | 2% | 5% | |
| Market Structure Investment SR | >0% | >2% | 1% | 9% | |
| # Households w/ Fixed Income Share | >22% | >22% | 1% | 2% | |

Examples of Viable Pair Feature Conditions with Negative Lift

| Pair Features | Seller Conditions | Buyer Conditions | Lift% | Volume% | |
|---|---|---|---|---|---|
| # ALGs w/ Cash Equity Money Markets Share | <=15% | >13% | (4)% | 2% | Negative lift case from Client Account Mix |
| Total Fixed Income Govt. Securities SA | > 4% | <=7% | (3)% | 9% | Negative lift cases from Advisor Product Mix |
| Total Investment Annuity SA | <= 0% | > 0% | (4)% | 5% | |
| Investments ETF Fee-based SA | >0% | <=2% | (5)% | 2% | |
| # Households w/ Alternate Investments Share | <=6% | > 9% | (14)% | 1% | |

FIG. 3

SYSTEM AND METHOD FOR MATCHING ENTITIES USING MACHINE LEARNING

FIELD OF THE INVENTION

The present invention relates generally to data analysis and algorithmic or machine learning based matching of entities described with multiple variables using machine learning.

BACKGROUND OF THE INVENTION

In machine learning (ML) applications, multiple variables may be used to describe entities to be compared or matched. Simple or naïve use of machine learning may not produce accurate outcomes. Designing ML models naively may not produce the most effective models.

For example, financial advisors manage, maintain, or grow assets for clients and institutions. When they retire, succession planning may be used so their book of business is transferred to one or more unretired advisors at their firms. Similar situations exist in the insurance sector and other sectors involving experts or professionals. Matching algorithms may be used to match entities such as retiring managers with other entities such as successors to whom retiring managers' business is to be transferred. Other entities may be matched using matching algorithms, such as in the context of identifying replacement components for obsolete or discontinued parts for mechanical or electronic systems.

In some use cases, unretired advisors are matched to retiree advisors based on rules-based methods. These methods may consider a finite number of factors, for example in the range of 4-5 factors, and decisions on the transitions may be made by local managers. Using a handful of factors to identify successors may be sub-optimal. In addition, current process for advisor succession planning is often manually done by managers. These manual systems and processes are unscalable and are typically unstandardized across regions/geographies.

SUMMARY OF THE INVENTION

A system and method design an ML, AI or other model by more accurately determining, from a set of features describing entities a subset of features to use in ML or artificial intelligence (AI).

A system and method may identify, among a pool of entities, the best matching entities using AI (e.g., replacement components for obsolete or discontinued parts for mechanical or electronic systems; professionals to take over for other professionals who are retiring, or other entities). An embodiment may for example determine, from a set of features describing a number of entities, a subset of features which when input to a machine learning module allow the machine learning module to match a pair of entities based on the ability of the second entity in the pair to successfully take over responsibilities handled by the first entity in the pair; train a machine learning module using the determined features; and for a first entity described by the determined set of features, use the machine learning module to determine a list of entities matching the first entity, each entity in the list of entities being associated with a matching score.

Embodiments may improve the technology of machine learning, feature selection in the context of machine learning, and matching entities, and in some embodiments may be standardized and agnostic to local perspectives (e.g. that of a team, office or region). Embodiments may be scalable, and may enable identification of matches from an entire population entities (e.g. all unretired advisors in an organization).

An embodiment may algorithmically identify prospects to take over for or replace entities such as retiring advisors amongst a large population (e.g. thousands) of potential "inheriting" entities, such as advisors, by considering a large set of advisor factors or attributes. A machine learning algorithm may identify the top 'n' prospects from a universe of advisors (who may be a broad fit or match with the retiring advisor) and who may have high likelihood to retain clients and assets. The top matches or prospects may be output on a user interface (UI), e.g. to a succession planning team.

BRIEF DESCRIPTION OF THE DRAWINGS

Non-limiting examples of embodiments of the disclosure are described below with reference to figures. The subject matter regarded as the invention is particularly pointed out and distinctly claimed in the claims. The invention, however, both as to organization and method of operation, together with objects, features and advantages thereof, may best be understood by reference to the following detailed description when read with the accompanied drawings.

FIG. 2 depicts a method of selecting features to use in a model, according to an embodiment of the present invention.

FIG. 3 depicts a set of features chosen with a tree method, according to an embodiment of the invention.

Figure 1:
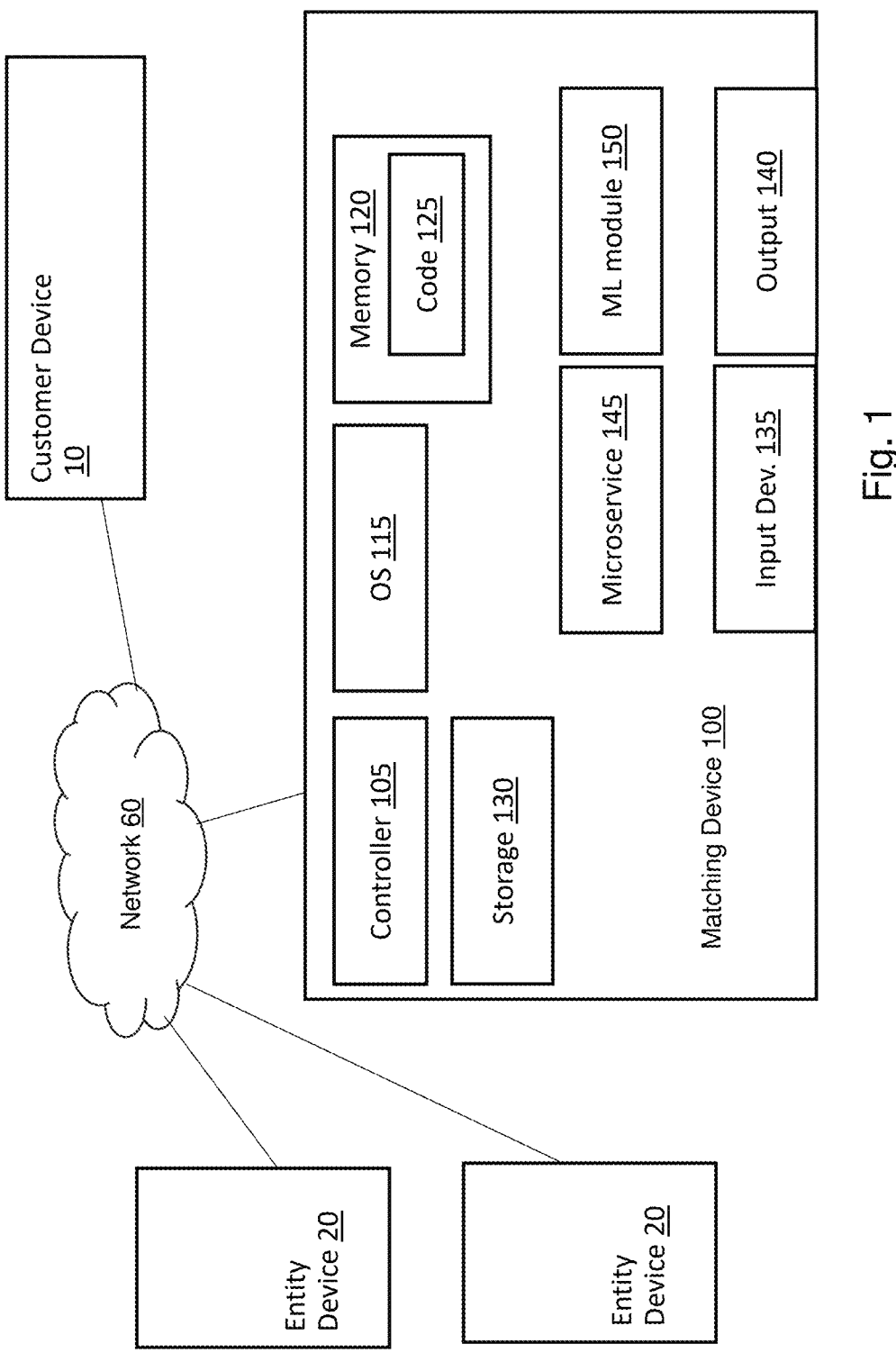
FIG. 1 depicts a system for matching entities according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

FIG. 1 depicts a system for matching or pairing entities according to embodiments of the present invention. While the example entities shown in FIG. 1 that are matched are advisors (of any sort), other entities, such as computer systems, software packages, or other systems or entities may be matched, including systems not requiring devices 20 as shown in FIG. 1. Referring to FIG. 1, entities to be matched such as advisors may use entity devices 20. In some cases, advisors may use entity devices 20 to communicate with customers, using customer devices 10. In other embodiments, there may be no customers using customer devices 10. Various computer systems may be connected by one or more networks 60, such as the internet, or an intranet. A matching device 100 may carry out algorithms for matching entities and/or automatically take action based on matches. Devices 10, 20 and 100 each may be or include, for example, a personal computer, a desktop computer, a laptop computer, a workstation, a server or cloud computer, a network device, a mobile computer, tablet or smartphone, or any other suitable computing device.

Matching device 100 includes example components which also may be used in other devices of FIG. 1 in some embodiments, and is shown in FIG. 1 as a high-level block diagram of an exemplary computing device according to some embodiments. However, each of devices 10, 20 and 100 may include other components. Matching device 100 may be a computer system including a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as an ML (machine learning) module 150, microservice(s) 145, and the various modules, units, etc. described herein, for example when executing code 125. More than one computing device 100 may be included in, and one or more computing devices 100 may be, or act as the components of, a system according to embodiments of the invention. One or more devices such as computing device 100 may carry out functions such as those described in FIG. 4.

Operating system 115 may be or may include any code segment to coordinate, schedule, or manage operation of device 100, for example, scheduling execution of software programs or enabling software programs or other modules or units to communicate. Memory 120 may be or may include, for example, a Random Access Memory (RAM), a read only memory (ROM), a Dynamic RAM (DRAM), a Flash memory, a volatile or non-volatile memory, a cache memory, or other suitable memory or storage units. Memory 120 may be a computer or processor non-transitory readable medium, or a computer non-transitory storage medium. Executable code 125 may be any executable code, e.g., an application, a program, a process, task or script. Executable code 125 may be executed by controller 105 possibly under control of operating system 115. One or more executable code 125 segments may configure controller 105 perform methods disclosed herein, and one or more executable code segments 125 may be loaded into memory 120 and cause controller 105, when executing code 125, to carry out methods described herein.

Storage system 130 may be or may include, for example, a hard disk drive, a CD-Recordable (CD-R) drive, a universal serial bus (USB) device or other suitable fixed or removable unit. Data used with methods described herein may be stored in storage system 130 and may be loaded from storage 130 into memory 120.

Input device(s) 135 may be or may include a mouse, a keyboard, a microphone, a touch screen or pad or any suitable input device. Output device(s) 140 may include one or more displays or monitors, speakers and/or any other suitable output devices. Various input/output (I/O) devices may be connected to computing device 100 as shown by blocks 135 and 140. For example, a wired or wireless network interface card (NIC), a printer, or a universal serial bus (USB) device may be included in input devices 135 and/or output devices 140.

Microservice(s) 145 may perform functions such as identifying entities who are in a pool of potential entities for match (e.g. identifying potential retirees), identifying entities such as advisors who are not in a pool of potential retirees, collecting information regarding entities (such as advisors) to be matched, etc. Microservices may allow various modules to communicate with each other and with infrastructure components and data stores, for example through 'RESTful APIs'.

A microservice based architectural solution may improve, in conjunction with other elements discussed herein, prior art systems and enable modules to review or determine matched entities in near real-time (e.g., compared to conventional systems which may take about a month on an average). Prior art solutions may work in a batch mode including a pre-computation of entity matching for all possible entities. This is a cost intensive process with lagged data used. Embodiments of the invention, in contrast, may be a trigger based approach where microservices can communicate in real time and computation of entity matching can be done using latest data for only the entity of interest.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While specific elements of FIG. 1 are hosted by specific computers, in other embodiments, such elements may be hosted by other computers, in cloud based systems, etc.

Using machine learning models, for example with gradient boosting, for each retiring advisor (referred to as a retiree), an embodiment may identify the top 'n' prospective entities. In one embodiment this may be advisors or successors who are a strong fit to inherit the retirees' responsibilities. An embodiment may optimize for successors' performance from the inherited book (e.g. responsibilities of an entity) across several dimensions, captured by features, between a retiree and prospective successors, for example similarities in the mix of clients, mix of assets, advisors' demographics, and retiree and successor proficiencies in various asset classes, products, and designations. In one embodiment, output for each (or a certain) entity (such as a retiring/seller entity) is a list of top-ranked entities (such as inheritor/buyer entities) that match a certain entity, ordered by match rank. For example, the top 'n' prospects to be paired with potential retiree X may be provided to a succession planning practice management team, who may determine the final match, while accounting for additional complex/regional preferences.

An embodiment may match or associate entities using artificial intelligence. Entities may be for example computer or other equipment, or software, to be replaced, advisors, investment advisors, wealth managers, insurance agents, healthcare workers or medical practitioners such as doctors, or other entities. For example, in the case of an investment advisor planning to retire, an embodiment may match or find another investment advisor within the same organization or company (which may be called an inheritor) who is most likely to successfully take over responsibilities handled by retiring advisor.

An embodiment may design an AI, ML or other model by determining, from a set of features describing entities (e.g. entities within an organization), a subset of features which when input to an ML or other model or module allow the model or module to match a pair of entities based on a measure of success, potential improvement, or predicted future success. Such a measure may be the ability of the second entity in the pair to successfully take over from the first entity in the pair. In some cases these features may correlate to identifying similarities between entities identified as a likely match, but in other cases features may be identified which, when input to an ML model, identify entities which have disjoint or different features, yet where one entity matches the other in a retiree/inheritor likelihood of success analysis. For example, inheriting entity A may be ranked high on an output match list for retiring entity B if for feature Q, entity A has a high value, and entity B has a low value. In one example, a retiring entity may have feature "share of AUM of high Return-on-Asset products (like Equities. Investments etc.)" be a high amount, and an entity ranked high on the retiring entity's match list may have a high value for "share of AUM of low Return-on-Asset products (like Fixed Income, Cash etc.)", because successors may have an incentive of generating higher revenue from products with relatively higher return on assets. In some cases, having a high value of the same feature for both entities (e.g., retiring and inheriting) may lead to high performance, but in other cases, a value in a retiree and a low value in inheritor for a feature may lead to high success. Embodiments may determine successful pairs of features (High-High or High-Low, etc.) algorithmically or using ML as described herein.

An ML module may be trained using the determined features by providing the ML module with pairs of entities, and determining features based on, for each pair, an amount of improvement occurring when an inheriting entity in the pair took over the responsibilities of the retiring entity in the pair. A feature pair may be the pair of values corresponding to the same feature in a pair of entities. Features may be grouped into categories.

In an organization, each entity may be described by many, e.g. hundreds, of common features. For example, entities which are financial advisors may have features describing mix of clients, mix of assets for clients, and proficiencies/ designations of sellers and buyers.

This may be performed based on historical data of inheritor entities taking over from retirees. Such scoring may be performed before the matching is needed, e.g. periodically. For example, every possible pair of known entities in a class of entities (e.g. all insurance agents or doctors within an organization) may be paired, and have a matching score or ranking (e.g. a ranking based on the score) created, periodically, before any matching is needed. Such a system may use the Python programming language to allow continuous parallel creation of, for each entity, a list of best ranked matches.

For example, an embodiment may, for existing entities such as investment advisors within an organization, pair each actually retired advisor (for advisors having retired in the past) with the advisor(s) who have actually inherited the assets and customers handled by the retired advisor, to create a set of pairs. For each pair, some score or metric of improvement or success may be measured: for example, if entity B inherits all customers from entity A, the amount of assets retained or grown, or how many customers retained, after a period of time, by B, may be a metric of success. Each pairing of historical data may thus receive a rating of success or improvement. Each entity may be associated with a set of features. For example, in the case of investment advisors, features may include new assets acquired (NAA), fixed income assets under management (AUM), cash products fee based revenue, mortgage fee revenue, money market fee based AUM, number of households with accounts, share of high net worth households, number of clients or number of account linked groups (ALGs), with cash equivalent share, number of households with 5-10 money market share, or other features. Features are typically numeric quantities that can be used to compare entities, but need not be. Embodiments may use past data for split inheriting, where advisor A handed responsibilities to multiple inheritor advisors B, C etc.; and matching or ratings for a potential retiring advisor X, handing off to inheritors Y, Z, etc. An embodiment may train and learn from multiple pairs A-B, A-C etc. A model may then predict for multiple pairs originating with the same retiree. e.g. X-Y and X-Z along with all possible inheritors for X. Such a prediction may be used to evaluate if Y and Z are the right inheritors, or if a model should look for other inheritors.

For each pair, features may be identified or determined which most contribute to improvement, or to reduction in importance, to identify features that can be predictive when used in a model. Embodiments may produce matches may involving entities having different or opposite parameters. An embodiment may give matches based on similar parameters but also, if the data indicates, matches which drive highest performance based on dissimilar parameters. In certain cases similar features drive performance, and in other cases similar features drive less performance.

Determining the subset of features may include using a decision tree model, the tree including decisions based on whether an entity in a pair has a feature above a threshold. Determining the subset of features may use a decision tree model including decisions based on whether an improvement, occurring after choosing a pair based on the entities in the pair sharing a feature attribute, is above a threshold.

FIG. 2 depicts a method of selecting features to use in a model, according to an embodiment of the present invention. Referring to FIG. 2, a tree may be used to determine the lift, success or improvement, or negative lift or decrease in performance, or to determine feature value pairs providing incremental value when used in an ML module. Lift or improvement may be, for example, the percentage improvement for a feature when an inheritor or buyer entity takes over for a retiree or seller entity, for example percentage asset growth for a class of investments when an inheritor takes over. Of course, other features, and other measures of desirability of a match, other than improvement or lift, may be used. The historical or existing data used for the tree selection may be actual data seen for past retirees having responsibility taken over by inheritors. Over a set of iterations, a specific actual retiree/inheritor pair may have its data, for a specific feature, input to a tree method. In FIG. 2, one pair of retiree-inheritor is shown. In order to convert or combine this data into data across all the pairs of actual retirees/inheritors, a process may codify this data for model training for all actual pairs A-X, B-Y etc. for each feature value found to be important. The average performance shown in FIG. 2 is the average performance of an inheriting entity compared to the retiree entity after inheriting across all pairs in the tree—here the example of 96%.

An automated process may create and use trees such as shown in FIG. 2. Such trees may be created using historical data from retirees and inheritors. A process may initiate tree development with a large number of features and keep or select those which provide lift (or the most positive lift, or the most negative lift), through experimentation and an iterative process. For example, in a first operation, a list of features for both retirees and inheritors may be chosen or created, such as Share of Clients with Cash equivalent products amount>0. Share of clients with AUM>5 MM, etc. In a second operation, multiple criteria for the created or chosen features may be created to be evaluated for a decision. For example, criteria may be Share of clients with AUM>5 MM: >10%, Share of clients with AUM>5 MM: >20%, etc. In a third operation, the created tree may be used, and a decision tree algorithm may evaluate all features pair for a specific buyer and retiree. For example, a decision tree may evaluate the case where Retiree Share of clients with AUM>5 MM: >10% and buyer Share of clients with AUM>5 MM: >20% 2; and evaluate the case where Retiree Share of clients with AUM>5 MM: >20% and buyer Share of clients with AUM>5 MM: >20%. In a fourth operation, a decision tree may provide and rank order a list of pairs evaluated in the third operation by lift the pair feature provides. In a fifth operation, a process may select feature pairs which provide positive or negative lift (e.g., shown in FIG. 3). A positive lift associated with feature values may tell the final algorithm that such combination of values will likely indicate higher performance hence give higher score. Conversely, a negative lift associated with features may tell the final algorithm that such combination of values will likely indicate lower performance hence give higher score. Both similarity or dissimilarity of features in pair can lead to positive or negative lift. While the tree shown in FIG. 2 makes decisions based on features being > or <0%, typically multiple trees, including decisions based on different options for each variable. A decision tree may evaluate various options for variables such as 0%, 5%, 10% etc. and may pick the pair that provides the best lift. In the case of FIG. 2, retiree >0% and buyer >0% showed the best lift. While in one embodiment features used in tree are calculated or normalized to be a share of the total amount for that entity (e.g. number of clients with Cash equivalent share >0% means for Retiree or buyer calculate (number of Clients with Cash equivalent)/(number of clients total for that entity), other methods of representing values associated with features may be used.

In each iteration, for a specific retiree/seller and inheritor/buyer pair, for a specific feature, the pair of entities may be compared first, at the branching level, to determine to what extent the seller/retiree and buyer/inheritor are similar for this feature; and leaves may be used to determine the amount of lift or improvement. Dissimilarity between features providing lift or success may also be identified. In one embodiment, each entity in a pair is taken individually and alternately in the branching of a decision tree: for example in node 210 of tree 200, it is determined if the seller feature is >0%. If not <0% the feature indicates this entity has a zero value for the feature; in other trees the > and <% may be a non-zero percentage; e.g. a branch may indicate a feature is <10%. If positive, the next decision point investigates the same feature for the buyer—for example in node 220, it is determined if the buyer feature being examined has a value of >0%. Leaf 230 is arrived at if both the seller and buyer have positive (>0%) values for the specific feature being evaluated; in such a case the among of lift or improvement for the feature based on this actual buyer taking over from this actual buyer is noted. Some leaves may include negative lift.

In one embodiment, one tree such as in FIG. 2 may be used for a large number of historical entity (e.g. buyer/seller) pairs to determine a set of features that are most useful. Each pair may be assigned to a leaf (e.g. leaf 230) such that each leaf may include one or more pairs, with the lift for that pair. A pair may be included in multiple leaves if it matches multiple decision tree results. Each pair may be placed in a leaf, the lift for that leaf may be averaged across all pairs in the leaf, and the decisions in the tree leading to the leaf indicate the lift (the average of the leaf) based on the features described in the decisions. For example, leaf 230 indicates that average lift of 3% is created when a certain seller feature and a certain buyer feature are >0%: thus if 3% is above the threshold, the features chosen for the model may be those features (here the seller feature and buyer feature used in decisions 210 and 220). E.g., the features involved in the decision leading to a leaf—such as feature seller Cash eq>0% and feature buyer cash eq>0% gives lift of 3%.—are chosen for model use, X, in the example of FIG. 2, indicates the average lift in the leaf is insignificant (e.g. absolute value<threshold) lift and thus the feature definitions leading to the leaf are not to be used (unless they are chosen based on other leaves). A large negative lift (e.g. negative beyond a threshold) may be useful and thus may indicate features to be used. In some embodiments, only leaves with more than a threshold of samples may be used. The decision tree may, during learning or formation, attempt to form leaves with low variance of lift within them. Known decision tree algorithms may be used to form trees.

After forming trees for multiple buyer/seller or retiree/inheritor pairs, data across trees may be consolidated to determine lift for specific values. For example, if in one example 2,000 pairs of retiree/buyer are evaluated, and average performance of the inheritor/buyer for these pairs is 90%. Within this group, there are 200 buyer/seller pairs with the value Retiree Cash share >0% and Buyer Cash Share>0%, and for this subgroup, the inheritor/buyer performance is 93%. The lift calculated for this condition Retiree Cash share >0% and buyer cash share >0% is 93%-90%=3%. In one embodiment, there is no upper bound to select positive or negative lift. A process may use all positive or negative lifts available in a dataset, for example the number of pairs that had exhibited such value. In the above example, 200 out of 2,000 retiree/inheritor pairs had value Retiree Cash share >0% and buyer cash share >0%, i.e. 10% of pairs. A process may select all pair conditions which had >1% volume and >1% Lift or <−1% lift. These may be configurable cut offs.

A collection or list of features with corresponding lift of improvement may be collected, by using such a tree method to review various, selected, or all features existing for a collection of entities. The top X features, e.g. those having or causing the most improvement, may be selected to train a model. For example, a decision tree may at each branch make a decision based on either of the retiree or inheritor, also based on the inheritor or buyer having greater or less than threshold X for the feature; the final decision may show, e.g. that where retiree has feature X>Xthreshold1, and inheritor has feature X>Xthreshold2, the lift is Y %. Feature data may be normalized before being input to a decision tree. For example, data for financial analysts may be normalized for AUM* or Revenue to its respective Share of AUM** (SA) or Share of Revenue. If a tree shows an analysis of a pair of actual retiree/actual inheritor, where the only facts are features and one measure of lift, the tree may find important features across multiple pairs because the tree may be used to analyze thousands of pairs at once, each leaf being one actual real-world pair. The pair of features that is found to drive performance is identified and used in the model.

In some embodiments, a decision tree may identify a positive lift or improvement in pairs or entities having a feature with different or opposite feature values, matching successors with retirees having different qualities from the successors. For example, a retiree managing a high proportion of high yield bond products may be matched with a successor with a low proportion of high yield products, possibly because such successors have an interest in inheriting a portfolio with more high yield products. Prior art systems may match similar entities, but embodiments of the present invention may improve such technologies by in some cases matching dissimilar entities, or entities with some dissimilar features.

In some embodiments, not all known features may be used. For example, features known to intuitively produce lift may be tested using a tree method.

FIG. 3 depicts a set of features chosen with a tree method, according to an embodiment of the invention. A set of features that produce the most lift or improvement may be chosen, and a set of features that produce the most negative lift may also be chosen, as these features may be used in a model to prevent pairing. For example, number of ALGs or clients w/Cash Equivalent Share, when on average a seller/retiree has greater than 0% and a buyer/inheritor has >0%, is predicted to produce 6% lift.

A set of features that is most significant in predicting success may be used to create or train a ML model or module, such as a decision tree, random forest model, NN, or other model. A random forest model may be trained using feedback (e.g. how far its output is from the ground truth). A random forest may be trained on actual buyer and seller data using independent and pair features and actual performance. Such a model may be trained to predict a score for any buyer seller combination in future. Hyperparameters may be parameters or aspects of the random forest that need to be tuned to get the best result of that algorithm. In training a model, the ground truth against which the model is trained may be, in the case of entities being financial advisors, lift, improvement, actual retention related data such as, percentage increase of a portfolio inherited by an entity after transfer from a retiree, number of clients retained after clients transferred, new assets an inheritor builds after inheriting from a retiree, etc. However, in some embodiments, since the amount of assets transferred varies widely depending on advisor, these numbers may be normalized before being used. For example, normalization of a value may include converting an amount to a percent of the portfolio of the entity that amount represents; e.g. if assets transferred is $1,000,000 and existing book for that entity is $10,000,000, the normalized value may be 10%.

The trained ML model or module may be used to determine the entities most likely to successfully take over responsibilities handled by a retiring entity, or the entities with a high likelihood to be successful when replacing a entity in a pair. For example, if an entity such as an investment advisor plans to retire, pairs may be created including the retiring entity as the first entity and other entities in the organization that are candidates for inheritor entities (possibly all other entities in the organization). Each pair including the first entity may be input to the model, which may output for each pair a score (e.g. improvement, lift, etc.), and the pairs having the highest X scores may be used to create a list of entities (typically the second entity in the pair) best matching the first entity. The list of entities may be ranked or ordered, and each entity in the list of entities associated with a matching score.

A matching score may be a measure of improvement or lift (e.g. an amount of improvement in a successor's portfolio after taking over for a retiree) or another measure of a success based on the matching of the pair. For example, each of a retiring entity and a potential inheriting entity may be represented by the same set of features, and the model may compare those features to produce a rating or score of how well the potential inheritor can handle the portfolio, customers, patients, etc. handled by the retiree. Such a score or rating of a potential inheritor entity may reflect the ability of the entity to successfully take over responsibilities handled by the retiree. A score may be the measure or ability (possibly predicted) of an entity (e.g. inheritor) in a pair to successfully take over responsibilities handled by the other entity in the pair (e.g. retiree). Such a metric may be a predicted amount of improvement occurring when the inheritor takes over from the retiree, or an amount of improvement being above a threshold. Such a metric may be amount of retention, or amount of asset retention: for example an improvement metric may measure the increase in amount of AUM or assets when the assets managed are passed from a retiring advisor to an inheriting advisor: if the inheriting advisor takes on managing $100,000 of assets from a retiring manager, and those assets grow to $110.000 over a certain period of time, the metric shows an improvement of 10%. Other metrics may include recommendation quality.

Filtering may be used, such that while already retired advisors may be used to create or train models, an output may only match currently existing or working soon-to-be retiring advisors to prospects using the remainder population of as of yet unretired advisors.

An embodiment may include an explanatory or justification module, which may explain which features contributed most to the inclusion or the ranking of a potential inheritor entity in a top predictive features list. The development of significant features using a tree as described elsewhere herein may contribute to the ability of such a model to explain outputs. Such a module may function by, for a pair of a retiree and the target inheritor, deleting or removing a feature from the input to the machine learning model and determining the effect on accuracy of the removing, e.g. comparing the outputs of the model before the feature is removed and after. If the accuracy changes by more than a threshold, that feature may be marked as significant, and included in a justification output. Output from an explanatory module may be, for each top-ranked match, explaining which features contributed most to the match. An additional explainability module may also identify factors specific to an inheritor or buyer by identifying the features that reduce model accuracy. For example, for an inheritor entity an embodiment may, after providing a top-ranked list including that entity, remove a feature (e.g. club member) from the input to the model, and if this reduces the entity's rank significantly (e.g. above a threshold), it can be identified that this feature is important to ranking that entity. An explanatory module may use the SHapley Additive exPlanations system (SHAP), using game theory to assign credit for a model's prediction to each feature. Such an embodiment may calculate a value that represents the contribution of each feature to the model outcome.

Figure 4:
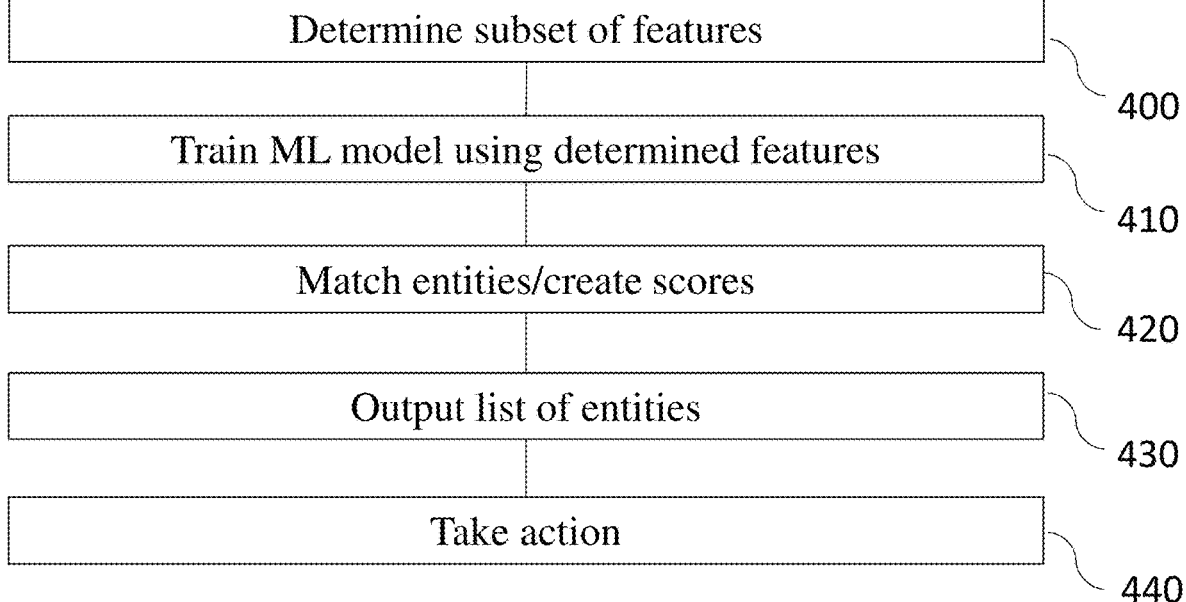
FIG. 4 depicts a flowchart of a method according to embodiments of the present invention.

FIG. 4 shows a flowchart of a method according to embodiments of the present invention. The operations of FIG. 4 may be performed by the systems shown in FIG. 1 and data as shown in other figures, but other systems may be used. The operations of FIG. 4 may be performed repeatedly, e.g. once per a cycle time period, e.g. once a day. While an exemplary method is depicted for illustrative purposes in the flowchart of FIG. 4, it will be appreciated by those skilled in the art that features and operations from this procedure may be selectively combined with features and operations from alternative embodiments of the invention without departing from the remit of the disclosure. Further, while certain features and operations are expressly included in the flowchart of FIG. 4, it will be appreciated by those skilled in the art that not all depicted features and operations are mandatory elements, and that different embodiments may omit certain features or operations without departing from the remit of the disclosure. Accordingly, embodiments including combinations of the features and operations recited in FIG. 4 are expressly within the remit of the disclosure and do not constitute an intermediate generalization of the same.

Referring to FIG. 4, in operation 400, a process may determine or select, from a set of features describing entities, a subset of features. Entities may be, for example, computer equipment or software to be replaced or swapped out, people handling certain responsibilities such as health professionals or financial professionals, replacement components for obsolete or discontinued parts for mechanical or electronic systems, or other entities. The determined features may, when input to an ML model or module, allow the model to match, or provide a matching score for, a pair or pairs of entities. Matching a pair of entities may include determining, based on a score, a second entity that best matches a first entity in a pair, based on a score or rating, for example based on the ability of the second entity in the pair to successfully take over responsibilities handled by the first entity. The matching may be based on a predicted success of the match, for example based on the ability (or predicted ability) of the second entity in the pair to successfully take over responsibilities handled by the first entity in the pair. Other measures of success may be used.

The determining may use a decision tree model, where the tree makes decisions based on whether an entity in a pair has a feature above a threshold. Such a tree may include decisions or branching based on whether lift or improvement, occurring after choosing a pair based on the entities in the pair sharing a feature attribute, is above a threshold. Features in a decision tree that lead to leaves having pairs with lift beyond a threshold (e.g. absolute value>threshold) may be selected for use with a model.

In operation 410, an ML model or module may be trained or created using the determined features. The model may be, for example, a random forest model, a NN, or other ML model. In one embodiment, training may provide or input to the machine learning module pairs of entities (e.g. entities that have been actually matched in the past) and for each pair an amount of improvement, lift, or other measure of match-ing, which occurred when the second entity in the pair took over the responsibilities of the first entity in the pair (e.g. a ground truth, the actual improvement which occurred).

In operation 420, entities may be matched, or scores may be created for entity pairs. For example, for a first entity described by the determined set of features, the ML model or module may be used to determine a list of entities matching, or best matching (according to a score) the first entity. Input to the ML model may be a set of pairs, where for each pair, the first entity is an entity for which a match is desired, and the second entity is a different entity, such that a set of pairs based the first entity and all other known entities is created: for each pair, an associated rating or score (e.g. matching score) is output indicating the rank, predicted success, or other measure of the match (e.g. how well one entity in a pair is predicted to perform when taking over from the other in the pair). Input to the ML model may be each pair of all known pairs (e.g. within a database; or known to an organization) of entities, where each pair is input to the model one at a time, and for each pair, an associated rating or score may be output. The overall output of repeatedly inputting pairs to the model may be a list of entities best matching the first entity according to the score, which may be ranked. Before entities are matched, pre-screening may be performed, for example algorithmically, to restrict the search space for a limited entities to make a matching algorithm more efficient.

In operation 430, matched entities may be output, for example in a list ranked by matching score, or in another format. An explanation of why certain matches were output may be created and provided. For example, as part of, or after, determining the list of entities matching the first entity, for matched entities or pairs, a process may remove a feature from the input to the machine learning model, re-input the matched entities, and determine the effect on accuracy of the output of the model, after the removing.

In operation 440, automatic action may take place based on the output matched entities, for example by matching device 100 or another component. For example, based on a pairing, data may automatically be transferred. In one embodiment, for the top matched entity, all accounts for a retiree in the pair may be automatically moved to the inheritor in the pair. In the case of entities being computer components, components may be automatically swapped or activated. Other automatic action may be taken.

Other operations or series of operations may be used.

While specific modules and servers are described herein as executing specific functions, in other embodiments, the functions described herein may be performed by different modules or hardware.

In the description and claims, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for matching computer equipment or software entities using artificial intelligence, the method comprising:

determining, from a set of features describing entities, a subset of features which when input to a machine learning module allow the machine learning module to match a pair of entities based on the ability of the second entity in the pair to successfully take over responsibilities handled by the first entity in the pair, wherein the pair of entities have disjoint features, and wherein the determining the subset of features comprises using a decision tree model, the tree comprising: decisions based on whether an entity in a pair has a feature above a threshold;

periodically training a machine learning module using the determined features, wherein the machine learning module comprises a random forest model, and wherein training the machine learning module using the determined features comprises providing the machine learning module with pairs of entities and for each pair an amount of improvement occurring when the second entity in the pair took over the responsibilities of the first entity in the pair;

collecting, using one or more microservices, information regarding a set of entities;

for a first entity described by the determined set of features, using the machine learning module to determine a list of entities matching the first entity, each entity in the list of entities associated with a matching score, wherein the determining of the list of entities matching the first entity comprises removing a feature from the input to the machine learning module and determining the effect on accuracy of the removing, and wherein the first entity described by the determined set of features and each entity in the list of entities each comprises computer equipment or software to be replaced; and automatically activating an entity in the list of entities.

2. The method of claim 1, wherein the matching score for an entity reflects the ability of the entity to successfully take over responsibilities handled by the first entity.

3. The method of claim 1, wherein the tree comprises decisions based on whether an improvement, occurring after choosing a pair based on the entities in the pair sharing a feature attribute, is above a threshold.

4. A system for matching computer equipment or software entities using artificial intelligence, the system comprising:

a memory; and a processor to:

determine, from a set of features describing entities, a subset of features which when input to a machine learning module allow the machine learning module to match a pair of entities based on the ability of the second entity in the pair to successfully take over responsibilities handled by the first entity in the pair, wherein the pair of entities have disjoint features, and wherein the determining the subset of features comprises using a decision tree model, the tree comprising: decisions based on whether an entity in a pair has a feature above a threshold;

periodically train a machine learning module using the determined features, wherein the machine learning module comprises a random forest model, and wherein training the machine learning module using the determined features comprises providing the machine learning module with pairs of entities and for each pair an amount of improvement occurring when the second entity in the pair took over the responsibilities of the first entity in the pair;

collect, using one or more microservices, information regarding a set of entities;

for a first entity described by the determined set of features, use the machine learning module to determine a list of entities matching the first entity, each entity in the list of entities associated with a matching score, wherein the determining of the list of entities matching the first entity comprises removing a feature from the input to the machine learning module and determining the effect on accuracy of the removing, and wherein the first entity described by the determined set of features and each entity in the list of entities each comprises computer equipment or software to be replaced; and automatically activating an entity in the list of entities.

5. The system of claim 4, wherein the matching score for an entity reflects the ability of the entity to successfully take over responsibilities handled by the first entity.

6. The system of claim 4, wherein the tree comprises decisions based on whether an improvement, occurring after choosing a pair based on the entities in the pair sharing a feature attribute, is above a threshold.

7. A method for determining the most successful pairing of computer equipment or software entities, the method comprising:

determining, from a set of features describing entities, features which when input to a machine learning module allow the machine learning module to pair entities based on the likelihood of the second entity in the pair to be successful when replacing the first entity in the pair, wherein the first entity in the pair and the second entity in the pair have disjoint features, and wherein the determining of the features comprises using a decision tree model, the tree comprising: decisions based on whether an entity in a pair has a feature above a threshold;

periodically training a machine learning module using the determined features, wherein the machine learning module comprises a random forest model, and wherein training the machine learning module using the determined features comprises providing the machine learning module with pairs of entities and for each pair an amount of improvement occurring when the second entity in the pair took over the responsibilities of the first entity in the pair;

collecting, using one or more microservices, information regarding a set of entities;

for a first entity described by the determined set of features, using the machine learning module to determine a list of entities to be paired with the first entity, each entity in the list of entities associated with a score, wherein the determining of the list of entities to be paired with the first entity comprises removing a feature from the input to the machine learning module and determining the effect on accuracy of the removing, and wherein the first entity described by the determined set of features and each entity in the list of entities each comprises computer equipment or software to be replaced; and automatically activating an entity in the list of entities.

8. The method of claim 7, wherein the score for an entity reflects the ability of the entity to successfully take over responsibilities handled by the first entity.

9. The method of claim 7, wherein the tree comprises decisions based on whether an improvement, occurring after choosing a pair based on the entities in the pair sharing a feature attribute, is above a threshold.

\* \* \* \* \*